(12) United States Patent
Salmela et al.

(10) Patent No.: US 7,827,313 B2
(45) Date of Patent: Nov. 2, 2010

(54) ADDRESSING METHOD AND METHOD AND APPARATUS FOR ESTABLISHING HOST IDENTITY PROTOCOL (HIP) CONNECTIONS BETWEEN LEGACY AND HIP NODES

(75) Inventors: Patrik Salmela, Kirkkonummi (FI); Jorma Wall, Espoo (FI); Petri Jokela, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 831 days.

(21) Appl. No.: 10/589,238

(22) PCT Filed: Feb. 13, 2004

(86) PCT No.: PCT/EP2004/050129

§ 371 (c)(1),
(2), (4) Date: May 23, 2007

(87) PCT Pub. No.: WO2005/081466

PCT Pub. Date: Sep. 1, 2005

(65) Prior Publication Data

US 2007/0274312 A1 Nov. 29, 2007

(51) Int. Cl.
*G06F 15/16* (2006.01)
*H09L 9/32* (2006.01)
*H04B 1/26* (2006.01)

(52) U.S. Cl. .................. 709/246; 709/230; 713/170; 455/331

(58) Field of Classification Search .............. 713/170; 455/331; 709/230, 246
See application file for complete search history.

(56) References Cited

U.S. PATENT DOCUMENTS 6,118,784 A  9/2000 Tsuchiya et al.
(Continued)

FOREIGN PATENT DOCUMENTS

EP  0 840 482 B1  4/2007

OTHER PUBLICATIONS

Eggert, "Host Identity Protocol (HIP) Rendezvous Mechanisms; draft-eggert-hip-rendezvous", Internet Draft, Network Working Group, Feb. 5, 2004, pp. 1-26, XP002300905.*

(Continued)

*Primary Examiner*—William R Korzuch
*Assistant Examiner*—Trang Doan
(74) *Attorney, Agent, or Firm*—Nixon & Vanderhye P.C.

(57) ABSTRACT

A method is provided of at least partially securing communications, via a HIP proxy (16), between a first host (12) which is not HIP enabled and a second host (14) which is HIP enabled, the method comprising: sending (A) a query from the first host (12) to resolve the IP address of the second host (14); in response to said query, retrieving (B, C) an IP address ($IP_{fa}$) and HIT ($HIT_{hip}$) associated with the second host (14), returning (E) from the proxy (16) a substitute IP address ($IP_{res}$) associated with the second host (14), and maintaining (D) at the proxy (16) a mapping between the substitute IP address ($IP_{res}$), the retrieved IP address ($IP_{fa}$) and the retrieved HIT ($HIT_{hip}$); and upon receipt (F) of a session initiation message (TCP SYN) at the proxy (16) from the first host (12) including as its destination address the substitute IP address ($IP_{res}$), using the mapping to negotiate a secure HIP connection (22) between the proxy (16) and the second host (14).

20 Claims, 11 Drawing Sheets

U.S. PATENT DOCUMENTS

| | | | | |
|---|---|---|---|---|
| 6,839,323 | B1* | 1/2005 | Foti | 370/235 |
| 7,028,311 | B2* | 4/2006 | Roach et al. | 719/328 |
| 7,274,675 | B2* | 9/2007 | Iveland et al. | 370/260 |
| 7,340,535 | B1* | 3/2008 | Alam | 709/246 |
| 7,532,614 | B2* | 5/2009 | Ruyle et al. | 370/352 |
| 2002/0194378 | A1* | 12/2002 | Foti | 709/246 |

OTHER PUBLICATIONS

Nikander et al, "End-Host Mobility and Multi-Homing with Host Identity Protocol; draft-nikander-hip-mm-00.txt", [nternet Draft, Network Working Group, Jun. 17, 2003, pp. 1-32, XP015004615.*

International Search Report of PCT/EP2004/050129, mailed Oct. 28, 2004.

* cited by examiner

PRIOR ART
FIG. 2
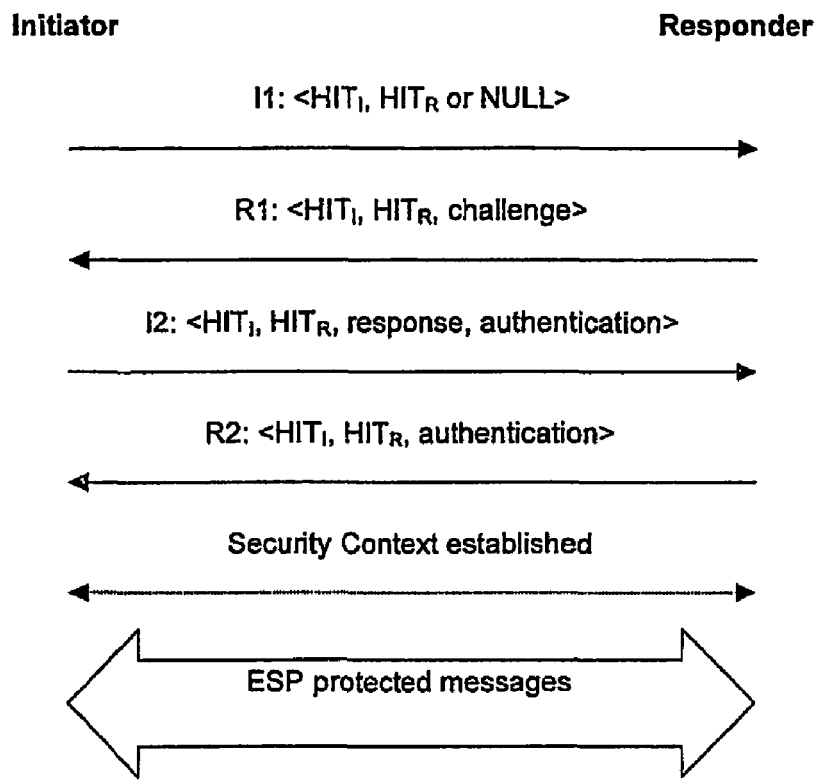
FIG. 3  PRIOR ART
Logical new packet structure
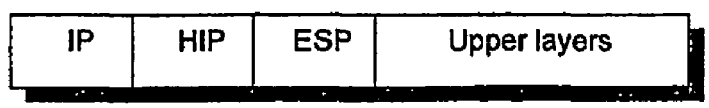
Actual packet structure after the HIP negotiation

FIG. 7

Packet structures

| IP header | TCP/UDP/ESP/HIP header | Data |
|---|---|---|

E.g. IP($IP_a$, $IP_b$)

IP
| src addr | dst addr |

TCP
| src port | dst port | tcp data |   E.g. TCP(43223, 80, xxx)

UDP
| src port | dst port | udp data |   E.g. UDP(34223, 53, xxx)

ESP
| SPI | SeqNo | esp data |   E.g. ESP(61342, 322, xxx)

HIP
| Packet id | src HIT | dst HIT |   E.g. HIP(I1, $HIT_a$, $HIT_b$)

TCP / UDP / ESP / HIP
| info |   E.g. UDP(xxx)

Examples:
IP($IP_a$, $IP_b$) ; HIP(I1, $HIT_a$, $HIT_b$)

IP($IP_a$, $IP_b$) ; TCP(43223, 80, TCP SYN)

IP(IPa, IPb) ; UDP(34223, 53, DNS request)

IP(IPa, IPb) ; ESP(61342, 322, TCP(43223, 80, TCP SYN))

ADDRESSING METHOD AND METHOD AND APPARATUS FOR ESTABLISHING HOST IDENTITY PROTOCOL (HIP) CONNECTIONS BETWEEN LEGACY AND HIP NODES

This application is the US national phase of international application PCT/EP2004/050129, filed 13 Feb. 2004, which designated the U.S., the entire content of which is hereby incorporated by reference.

BACKGROUND OF THE INVENTION

1. Field of the Invention

The present invention relates to a method of at least partially securing communications between a host which is not HIP enabled and another host which is HIP enabled. The present invention also relates to a communications system and HIP proxy using such a method.

2. Description of the Related Art

When the Internet was originally devised, hosts were fixed in location and there was implicit trust between users despite the lack of real security or host identification protocols, and this situation continued even upon wider uptake and use of the technology. There was little need to consider techniques for dealing with host mobility since computers were relatively bulky and immobile.

With the revolution in telecommunications and computer industry in the early 1990's, smaller communication equipment and computers became more widely available and the invention of the World Wide Web, and all the services that emerged with it, finally made the Internet attractive for the average person. The combination of increasing usage of the network and mobile telecommunications created the need for secure mobility management in the Internet.

The increasing number of involved parties, and the monetary transactions that were needed for certain services, also created a need for added application level security. Currently, the most widely used encryption protocols, for example SSL/TLS, are running within the upper network layers, for example TCP.

Taking into account the above mobility management and security issues, the Mobile IP standard (C. Perkins, "IP Mobility Support for IPv4", RFC 3220, IETF, 2002) and the Mobile IPv6 standard (D. Johnson, C. Perkins, J. Arkko, "Mobility Support in IPv6", Internet Draft, work in progress, draft-ietf-mobileip-ipv6-24.txt, IETF, 2003) have been introduced. Together these specifications are planned to provide mobility support for the next generation Internet Security work is developing in the form of IPsec, and related activities, such as various key exchange protocols, with the aim being to provide security in the IP layer. However, experience has shown that it is fairly hard to reach combined security and mobility using the current standards.

An IP address describes a topological location of a node in the network. The IP address is used to route the packet from the source node to the destination. At the same time the IP address is also used to identify the node, providing two different functions in one entity. This is akin to a person responding with their home address when asked who they are. When mobility is also considered, the situation becomes even more complicated: since IP addresses act as host identifiers in this scheme, they must not be changed, however, since IP addresses also describe topological locations, they must necessarily change when a host changes its location in the network. Clearly, it is impossible to achieve both stability and dynamic changes at the same time.

In the case of Mobile IP, the solution is to use a fixed home location providing a "home address" for the node. The home address both identifies the node and provides a stable location for it when it is at home. The current location information is available in the form of a care-of address, which is used for routing purposes when the node is away from home.

Another solution to the problem is to separate the identification and location functions from each other, and this is the approach taken in the Host Identity Protocol (HIP) proposal (R. Moskowitz, P. Nikander, P. Jokela, "Host Identity Protocol", Internet Draft, work in progress, draft-moskowitz-hip-07.txt, IETF, 2003). HIP separates the location and identity roles of IP addresses by introducing a new name-space, the Host Identity (HI). In HIP, the Host Identity is basically a public cryptographic key of a public-private key-pair. The public key identifies the party that holds the only copy of the private key. A host possessing the private key of the key-pair can directly prove that it "owns" the public key that is used to identify it in the network. The separation also provides a means to handle mobility and multi-homing in a secure way.

HIP is discussed in more detail below, but is not the only proposal based around the idea of location and identity separation. FARA (D. Clark, R. Braden, A. Falk, V. Pingali, "FARA: Reorganizing the Addressing Architecture", ACM SIGCOMM 2003 Workshops, Aug. 25 & 27, 2003) is a generalized model of ideas that provides a framework from which the actual architecture can be derived. FARA could make use of the HIP when the node identifications are verified, and consequently HIP could be a part of a particular FARA instantiation. The PeerNet proposal (J. Eriksson, M. Faloutsos, S. Krishnamurthy, "PeerNet: Pushing Peer-to-Peer Down the Stack", IPTPS '03, Feb. 20-21, 2003) also discusses the location and identity separation. The Internet Indirection Infrastructure, $I^3$ (I. Stoica, et. al., "Internet Indirection Infrastructure", ACM SIGCOMM '02, Aug. 19-23, 2002) also defines a separation between the identity and routing information.

The Host Identity Protocol introduces a separation between the location and identity information at the IP layer. In addition to the separation, a protocol is defined to negotiate security associations (SAs) between HIP-enabled nodes.

With HIP, each host has one or more identities, which can be long-term or short-term, that can be used to identify it in the network. With HIP, an identifier is the public key of a public-private key pair. When the host possesses the private key, it can prove that it actually "owns" this identity that the public key represents; this is akin to showing an ID-card.

Each host can generate short-term keys to be used only for a short time. These are useful when it is not necessary for the node to be identified with the same identity later. For example, buying books from a bookstore may be a long-term relationship, while contacting a server once to collect user profiles may be considered to be a short-term action. In the latter case a short-term identity can be created to avoid more widespread dissemination of the long-term identity.

The HIP Host Identity (HI), being a public key, can be quite long and is therefore not practical in all situations. In HIP, the HI is represented with a 128-bit long Host Identity Tag (HIT) that is generated from the HI by hashing it. Thus, the HIT identifies a HI. Since the HIT is 128 bits long, it can be used for IPv6 applications directly as it is exactly the same length as IPv6 addresses.

When HIP is used, the upper layers, including the applications, no longer see the IP address. Instead, they see the HIT as the "address" of the destination host. The location information is hidden at a new layer, to be described below. The IP addresses no longer identify the nodes; they are only used for routing the packets in the network.

Applications are not typically interested in location information but do need to know the identity of their peers. The identity is represented by the HIT. This means that the IP address only has importance on lower layers where routing is concerned. The HITs, which the applications use, must be mapped to the corresponding IP addresses before any packets leave the host. This is achieved in a new Host Identity Layer as described below.

FIG. 1 of the accompanying drawings illustrates the various layers in HIP, comprising the standard transport layer 4, network layer 8 and link layer 10, with a process 2 communicating with the transport layer 4 below it. With HIP, a new Host Identity Layer 6 is disposed between the transport layer 4 and the network layer 8.

Locally, each HI and its associated HIT are mapped to the IP addresses of the node. When packets are leaving the host, the correct route is chosen (by whatever means) and corresponding IP addresses are put into the packet as the source and destination addresses. Each packet arriving from the upper layer contains the HIT of the peer as the destination address. The mapping between the HIT and the location information can be found at the HI layer 6. Hence, the destination address is converted to the mapped IP address, and the source HIT is converted to source IP address.

The mapping between a peer HIT and IP address can be retrieved in several ways, one of which being from a DNS server. The location information can be updated by the peer node any time. The update procedure will be discussed in more detail in the mobility management subsection.

HIP defines a base message exchange containing four messages, a four-way handshake, and this is used to create a security association (SA) between HIP-enabled hosts. During the message exchange, the Diffie-Hellman procedure is used to create a session key and to establish a pair of IPsec Encapsulating Security Payload (ESP) Security Associations (SAs) between the nodes.

FIG. 2 of the accompanying drawings illustrates the operation of the four-way handshake. The negotiating parties are referred to as the Initiator, starting the connection, and the Responder. The Initiator begins the negotiation by sending an I1 packet that contains the HITs of the nodes participating in the negotiation. The destination HIT may also be zeroed, if the Responder's HIT is not known by the Initiator.

When the Responder gets the I1 packet, it sends back an R1 packet that contains a puzzle to be solved by the Initiator. The protocol is designed so that the Initiator must do most of the calculation during the puzzle solving. This gives some protection against DoS attacks. The R1 initiates also the Diffie-Hellman procedure, containing the public key of the Responder together with the Diffie-Hellman parameters.

Once the R1 packet is received, the Initiator solves the puzzle and sends a response cookie in an I2 packet together with an IPsec SPI value and its encrypted public key to the Responder. The Responder verifies that the puzzle has been solved, authenticates the Initiator and creates the IPsec ESP SAs. The final R2 message contains the SPI value of the Responder.

The SAs between the hosts are bound to the Host Identities, represented by the HITs. However, the packets travelling in the network do not contain the actual HI information, but the arriving packet is identified and mapped to the correct SA using the Security Parameter Index (SPI) value in the IPsec header. FIG. 3 of the accompanying drawings shows the logical and actual packet structures when it travels in the network.

From the above it is clear that changing the location information in the packet does not create any problems for the IPsec processing. The packet is still correctly identified using the SPI. If, for some reason, the packet is routed to a wrong destination, the receiver is not able to open the packet as it does not have the correct key.

When an outgoing packet arrives at the HI layer from the above layer, the destination HIT is verified from the IPsec SADB. If an SA matching to the destination HIT is found, the packet is encrypted using the session key associated with the SA.

The HIT cannot be used to route the packet. Thus, the destination (and source) addresses must be changed to match the IP addresses of the nodes. These mappings are stored, as mentioned earlier, in the HI layer. After the addresses have been changed, the packet can be sent to the network where it is routed to the destination using the IP address information.

At the receiving host, the SPI value is used to find the correct SA form the IPsec SADB. If an entry is found, the IP addresses can be changed to corresponding HITs and the packet can be decrypted using the session key.

Mobility is defined to be the situation where a host moves while keeping its communication context active, or in other words the host changes its topological location, described by the IP address, while still maintaining all existing connections active. The processes running on the host do not see the mobility, except possibly if the experienced quality of service changes.

The mobile host can change the location inside one access network, between different access technologies, or even between different IP address realms, for example between the IPv4 and IPv6 networks. In HIP, the application doesn't notice the change in the IP address version. The HI layer hides the change completely from upper layers. Of course, the peer node must be able to handle the location update that changes the IP version and packets must be routable using some compatible address. If a node does not have both IPv4 and IPv6 connectivity, it may use a proxy node that performs the address version conversion and provides connectivity on behalf of the node.

Multi-homing refers to a situation where an end-point has several parallel communication paths that it can use. Usually multi-homing is a result of either the host having several network interfaces (end-host multi-homing) or due to a network between the host and the rest of the network having redundant paths (site multi-homing).

With HIP, the separation between the location and identity information makes it clear that the packet identification and routing can be cleanly separated from each other. The host receiving a packet identifies the sender by first getting the correct key and then decrypting the packet. Thus, the IP addresses that are in the packet are irrelevant.

A HIP Mobile Node (HMN), moving in the network, may change the point of attachment to the Internet constantly. When the connection point is changed, so does the IP address. This changed location information must be sent to the peer nodes, i.e. HIP Correspondent Nodes (HCN), and this is illustrated in FIG. 4 of the accompanying drawings. The same address can also be sent to a Forwarding Agent (FA) of the HMN, so that the HMN can be reached also via a more stable point. The DNS system is too slow to be used for constantly changing location information. Therefore, there must be a more stable address that can be used to contact the HMN. This address is the address provided by the FA.

The HIP Mobility and Multi-homing protocol (P. Nikander, J. Arkko, P. Jokela, "End-Host Mobility and Multihoming with Host Identity Protocol", Internet Draft, work in progress, draft-nikander-hip-mm-00.txt, IETF, 2003) defines a readdress (REA) packet that contains the current IP address of the HMN. When the HMN changes location and IP address, it generates a REA packet, signs the packet with the private key matching to the used HI, and sends the packet to the peer node and to the FA.

When the peer node receives a REA packet, it must start an address verification process for the IP address that is included in the REA packet. The address verification is needed to avoid accepting false updates from the HMN. It sends an Address Check (AC) packet to the address that was in the REA packet. When the HMN receives an AC that matches to the REA sent earlier, it responds with an Address Check Reply (ACR) packet. After the peer node has received the ACR packet, the address verification is completed and it can add the IP address as the location information of the HMN.

Because the HMN can move between networks using different IP address versions, the address received by the HCN may also be from a different address family than the previous address.

The HCN may support only one IP address version. In this case, the HCN must use some other proxy node that can be used for routing packets over to the other IP address version network.

A multi-homed HIP host, having multiple IP addresses configured on different interfaces connected to different access networks, has much more possibilities to handle the traffic towards a peer node. As it has multiple IP addresses presenting its current location in the network, it may want to tell all of these addresses to its peer nodes. To do so, the multi-homed HIP node creates a REA packet that contains all the addresses that it is able to use towards that particular node. This set of addresses may contain all addresses it has, or some subset of these addresses. When the peer node receives the REA packet with the multiple addresses, it must make address verification for each of these addresses to avoid possible false updates.

The HCN sends a set of AC packets destined to IP addresses included in the REA packet. When the HMN receives these ACs, it responds to each of these with ACRs. The HCN can determine from the received ACR packets, which of the addresses were valid.

False, or non-routable, addresses in the REA packet may be caused either because the HMN is a malicious node, it has an error in the stack implementation, or the HMN may be inside a network that uses private addresses that are not routable in the Internet.

A multi-homed HIP node is able to use all of the available connections, but efficient usage of the connections requires a policy system that has knowledge of the underlying access networks and can control the usage of them. Such a policy system can use different kinds of information: user preferences, operator preferences, input from the network connections, such as QoS, and so on.

In order to start the HIP exchange with a mobile node, the initiator node needs to know how to reach the mobile node. Although Dynamic DNS could be used for this function for infrequently moving nodes, an alternative to using DNS in this fashion is to use the piece of static infrastructure introduced above, the Forwarding Agent (also referred to as a HIP rendezvous server). Instead of registering its current dynamic address with the DNS server, the mobile node registers the address(es) of its Forwarding Agent(s). The mobile node keeps the Forwarding Agent(s) continuously updated with its current IP address(es). A Forwarding Agent simply forwards the initial HIP packet from an initiator to the mobile node at its current location. All further packets flow between the initiator and the mobile node. There is typically very little activity on a Forwarding Agent, mainly address updates and initial HIP packet forwarding. Thus, one Forwarding Agent can support a large number of potential mobile nodes. The mobile nodes must trust The Forwarding Agent to properly maintain their HIT and IP address mappings. A Forwarding Agent can be used even for nodes that are fixed in location, since it is often the case that fixed nodes can change their IP address frequently, for example when it is allocated each time an Internet connection is set up by a Service Provider for that node.

The Forwarding Agent is also needed if both of the nodes are mobile and happen to move at the same time. In that case, the HIP readdress packets will cross each other in the network and never reach the peer node. To solve this situation, the nodes should remember the Forwarding Agent address, and re-send the HIP readdress packet to the Forwarding Agent if no reply is received.

The mobile node keeps its address current on The Forwarding Agent by setting up a HIP association with the Forwarding Agent and sending HIP readdress packets to it. A Forwarding Agent will permit two mobile systems to use HIP without any extraneous infrastructure (in addition to the Forwarding Agent itself), including DNS if they have a method other than a DNS query to get each other's HI and HIT.

In the case of legacy equipment, a host may not be HIP-enabled, and the only option is to identify connections between hosts using IP addresses. This is not secure. The situation may be improved by locating a HIP proxy between the HIP-enabled host and the host which cannot use HIP. A typical scenario would be a small corporate LAN where the client terminals are not HIP-enabled. Traffic is routed to correspondent hosts (which are HIP-enabled) via the HIP proxy.

This arrangement is illustrated in FIG. 5 of the accompanying drawings. In FIG. 5, a legacy host 12 is shown communicating with a HIP-enabled node 14 (having the domain name "hip.foo.com") via a HIP proxy node 16. The legacy host 12 accesses the HIP proxy node 16 over an access network 18 while the HIP proxy node 16 accesses the HP node 14 over the Internet 20. To partially secure the connection between the legacy host 12 and the HIP node 14, all communications between the HIP proxy node 16 and the HIP node 14 are through a Security Association set up between the HIP proxy node 16 and the HIP node 14 in a similar way to that described above with reference to FIG. 3.

However, even before the Security Association 22 shown in FIG. 5 can be set up to enable communication between the legacy host 12 and the HIP node 14, a problem arises when the legacy host 12 tries to resolve the IP address of the HIP node 14 by sending a query to a DNS server 24-1 (and in turn DNS server 24-2) when the HIP node 14 is located behind a Forwarding Agent 26 as described above. The DNS server 24-1 will return the HIT of the HIP node 14 together with the IP address of the Forwarding Agent 26. As the legacy host 12 is not HIP enabled, it will disregard the HIT and start sending messages to the Forwarding Agent 26. Without the HIT, the Forwarding Agent 26 will not be able to resolve the destination address of these messages since it is most likely that several HIP nodes will use the same Forwarding Agent 26. Likewise, since the legacy host 12 discards the HIT and uses only the IP address of the HIP node 14 when initiating a connection, the HIP proxy node 16 is unable to initiate HIP negotiation between itself and the HIP node 14 because it does not know the HIT of the HIP node 14.

It is desirable to provide a method of at least partially securing communications between a first host which is not HIP enabled and a second host which is HIP enabled via a HIP proxy that avoids the above-mentioned problems.

SUMMARY OF THE INVENTION

According to a first aspect of the present invention there is provided a method of at least partially securing communications, via a HIP proxy node, between a first host which is not HIP enabled and a second host which is HIP enabled, the method comprising: sending a query from the first host to resolve the IP address of the second host; in response to said query, retrieving an IP address and HIT associated with the second host, returning from the HIP proxy node a substitute IP address associated with the second host, and maintaining at the HIP proxy node a mapping between the substitute IP address, the retrieved IP address and the retrieved HIT; and upon receipt of a session initiation message at the HIP proxy node from the first host including as its destination address the substitute IP address, using the mapping to negotiate a secure HIP connection between the HIP proxy node and the second host.

The method may comprise looking up the retrieved IP address and the retrieved HIT from the mapping based on the substitute IP address in the session initiation message, and performing the HIP negotiation using the retrieved IP address and the retrieved HIT to locate and identify the Responder together with an IP address and HIT of the HIP proxy node to locate and identify the Initiator.

The retrieved IP address may be the IP address of a Forwarding Agent used by the second host, and further comprising initiating the HIP negotiation between the HIP proxy node and the second host by sending the initial HIP negotiation packet to the Forwarding Agent.

The method may further comprise, following receipt of the actual IP address of the second host at the HIP proxy node during the HIP negotiation, including the actual IP address in the mapping maintained at the HIP proxy node. The retrieved IP address may be replaced in the mapping by the actual IP address following its receipt at the HIP proxy node.

The retrieved IP address may be the actual IP address of the second host.

The method may further comprise, for an outgoing message received at the HIP proxy node after the secure HIP connection has been established including as its destination address the substitute IP address, using the mapping to route the message over the secure HIP connection to the second host. This may entail looking up the actual IP address and the retrieved HIT from the mapping based on the substitute IP address in the outgoing message, and routing the outgoing message to the second host using the actual IP address and the retrieved HIT to locate and identify the destination of the message, and using an IP address and HIT of the HIP proxy node to locate and identify the source of the message.

The method may further comprise completing the establishment of communications between the first and second hosts by forwarding the session initiation message from the HIP proxy node to the second host over the secure HIP connection, replying with a session acknowledgment message from the second host to the HIP proxy node over the secure HIP connection, and routing the session acknowledgment message to the first host. The session acknowledgment message may be a TCP ACK message.

The session initiation message may be a TCP SYN message.

The method may further comprise, for an incoming message received at the HIP proxy node from the second host over the established secure HIP connection, using a NAT function of the HIP proxy node to route the message to the appropriate destination host.

The above-mentioned query may be a DNS query. The HIP proxy node may intercept the DNS query from the first host. The HIP proxy node may perform the step of retrieving the IP address and HIT associated with the second host.

The HIP proxy node may retrieve the IP address and HIT associated with the second host from an external DNS server. Or the HIP proxy node may retrieve the IP address and HIT associated with the second host from an internal DNS server.

According to a second aspect of the present invention there is provided a communications system comprising a first host which is not HIP enabled, a second host which is HIP enabled, and a HIP proxy node, wherein: the first host comprises means for sending a query to resolve the IP address of the second host; the HIP proxy node comprises means for retrieving, in response to said query, an IP address and HIT associated with the second host, for returning a substitute IP address associated with the second host, for maintaining a mapping between the substitute IP address, the retrieved IP address and the retrieved HIT, and for using the mapping, upon receipt of a session initiation message from the first host including as its destination address the substitute IP address, to negotiate a secure HIP connection between the HIP proxy node and the second host.

According to a third aspect of the present invention there is provided method for use by a HIP proxy node of at least partially securing communications, via the HIP proxy node, between a first host which is not HIP enabled and a second host which is HIP enabled, the method comprising: receiving a query from the first host to resolve the IP address of the second host; in response to said query, retrieving an IP address and HIT associated with the second host, returning a substitute IP address associated with the second host, and maintaining a mapping between the substitute IP address, the retrieved IP address and the retrieved HIT; and upon receipt of a session initiation message from the first host including as its destination address the substitute IP address, using the mapping to negotiate a secure HIP connection between the HIP proxy node and the second host.

According to a fourth aspect of the present invention there is provided a HIP proxy node for use in at least partially securing communications, via the HIP proxy node, between a first host which is not HIP enabled and a second host which is HIP enabled, comprising: means for receiving a query from the first host to resolve the IP address of the second host; means for retrieving, in response to said query, an IP address and HIT associated with the second host, returning a substitute IP address associated with the second host, and maintaining a mapping between the substitute IP address, the retrieved IP address and the retrieved HIT; and means for using the mapping, upon receipt of a session initiation message from the first host including as its destination address the substitute IP address, to negotiate a secure HIP connection between the HIP proxy node and the second host.

According to a fifth aspect of the present invention there is provided an operating program which, when run on a HIP proxy node, causes the proxy to carry out a method according to the third aspect of the present invention.

According to a sixth aspect of the present invention there is provided an operating program which, when loaded into a HIP proxy node, causes the proxy to become one according to the fourth aspect of the present invention.

The operating program may be carried on a carrier medium, which may be a transmission medium or a storage medium.

BRIEF DESCRIPTION OF THE DRAWINGS

FIG. 2, also discussed hereinbefore, illustrates the operation of the four-way handshake in the HIP protocol;

FIG. 3, also discussed hereinbefore, shows the logical and actual packet structures in HIP;

FIG. 7 provides a more detailed schematic illustration of the packet structures used in TCP, UDP, ESP and HIP.

DETAILED DESCRIPTION OF THE PREFERRED EMBODIMENTS

Figure 1:
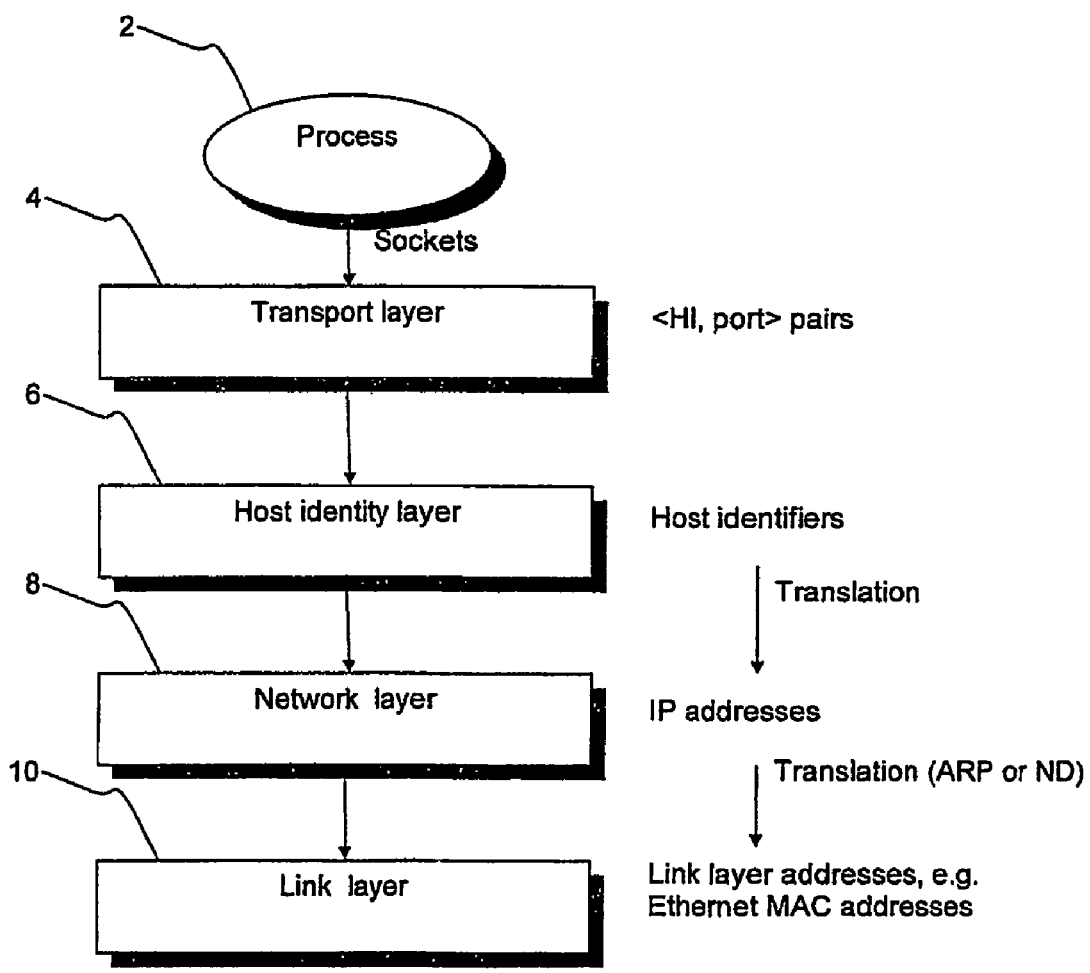
FIG. 1, discussed hereinbefore, illustrates the various layers in the Host Identity Protocol.
Figure 4:
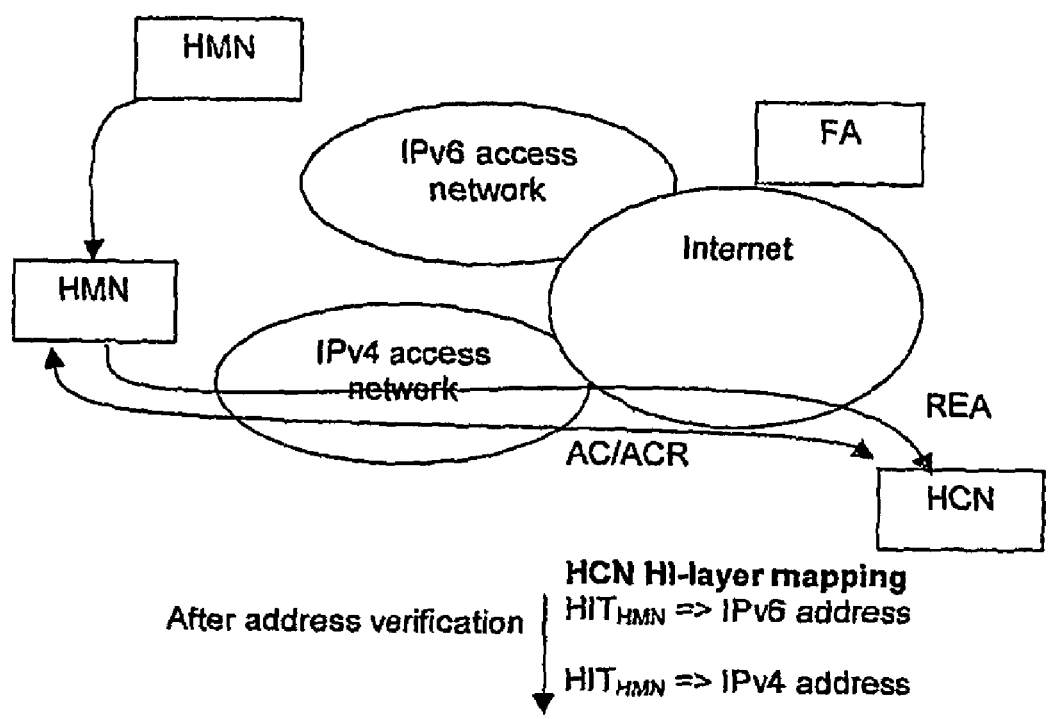
FIG. 4, also discussed hereinbefore, illustrates a hand over between IPv6 and IPv4.
Figure 5:
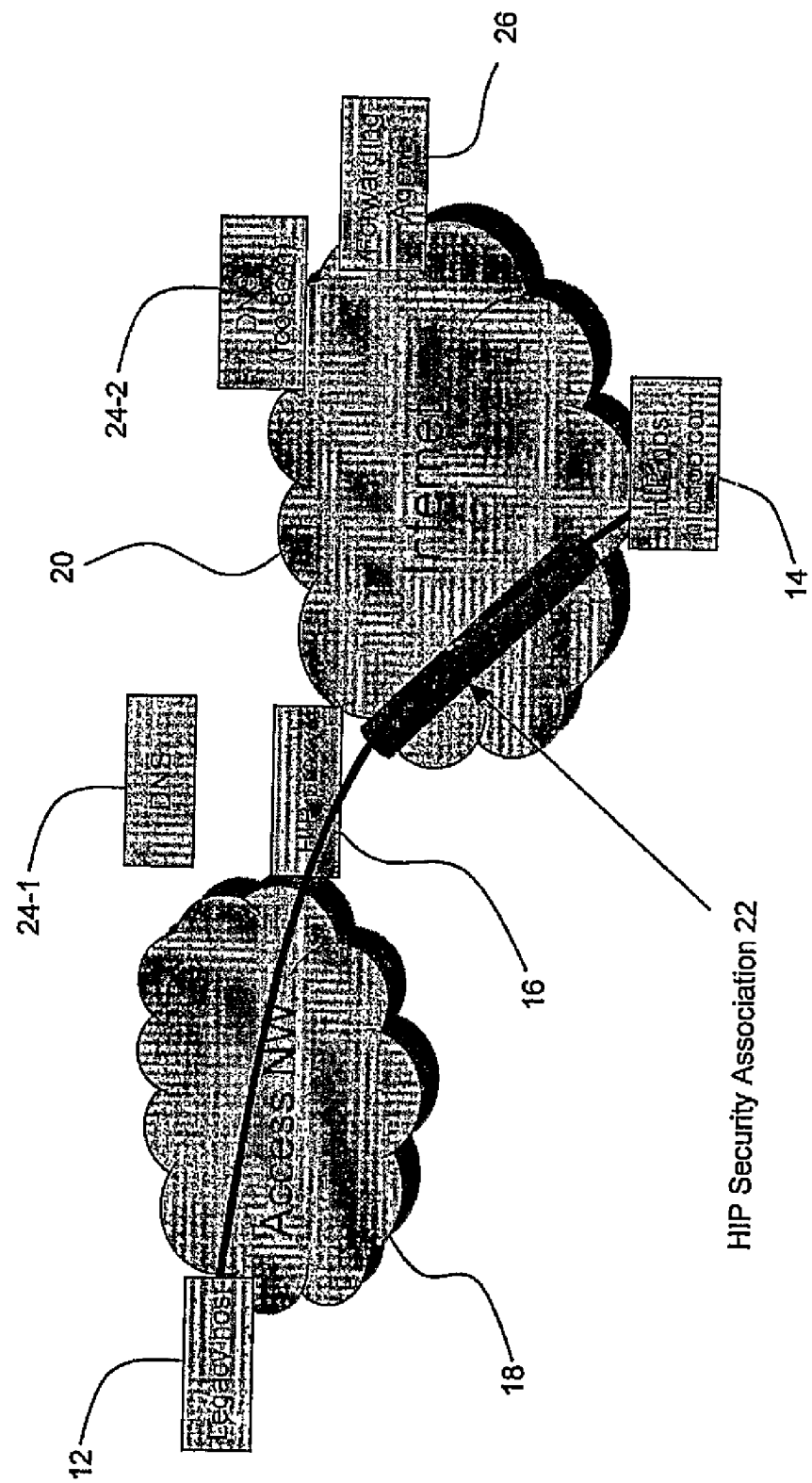
FIG. 5, also discussed hereinbefore, is a schematic diagram illustrating the general network set up for communications between a legacy host and a HIP node via a HIP proxy node.

An embodiment of the present invention will now be described within the general framework of the system described above with reference to FIG. 5. An embodiment of the present invention provides a method of at least partially securing communications between the legacy host 12, which is not HIP enabled, and the HIP host 14, which is HIP enabled via the HP proxy 16 (also referred to as "proxy" (also referred to as "HIP node") and "HIP proxy node"). Operation of an embodiment of the present invention will now be described with reference to the message exchange diagram of FIG. 6. The steps shown in FIG. 6 are also illustrated in more detail in FIGS. 8 to 12, while FIG. 7 gives a more detailed overview of the packet structures used in TCP, UDP (User Datagram Protocol), ESP and HIP.

Consider the situation where the legacy host 12 wishes to initiate communication between itself and the HIP host 14. The legacy host 12 knows the domain name of the HIP host 14 to be "hip.foo.com", and as the first step (marked as "A" in FIGS. 6 and 8) the legacy host 12 sends a Domain Name System (DNS) query to its usual DNS server in order to resolve the IP address of the HIP host 14. However, instead of being received directly at a DNS server, in an embodiment of the present invention the DNS query is intercepted by the HIP proxy 16, which itself sends a DNS query to the DNS server 24-1 (this is marked as "B" on FIGS. 6 and 8).

Figure 6:
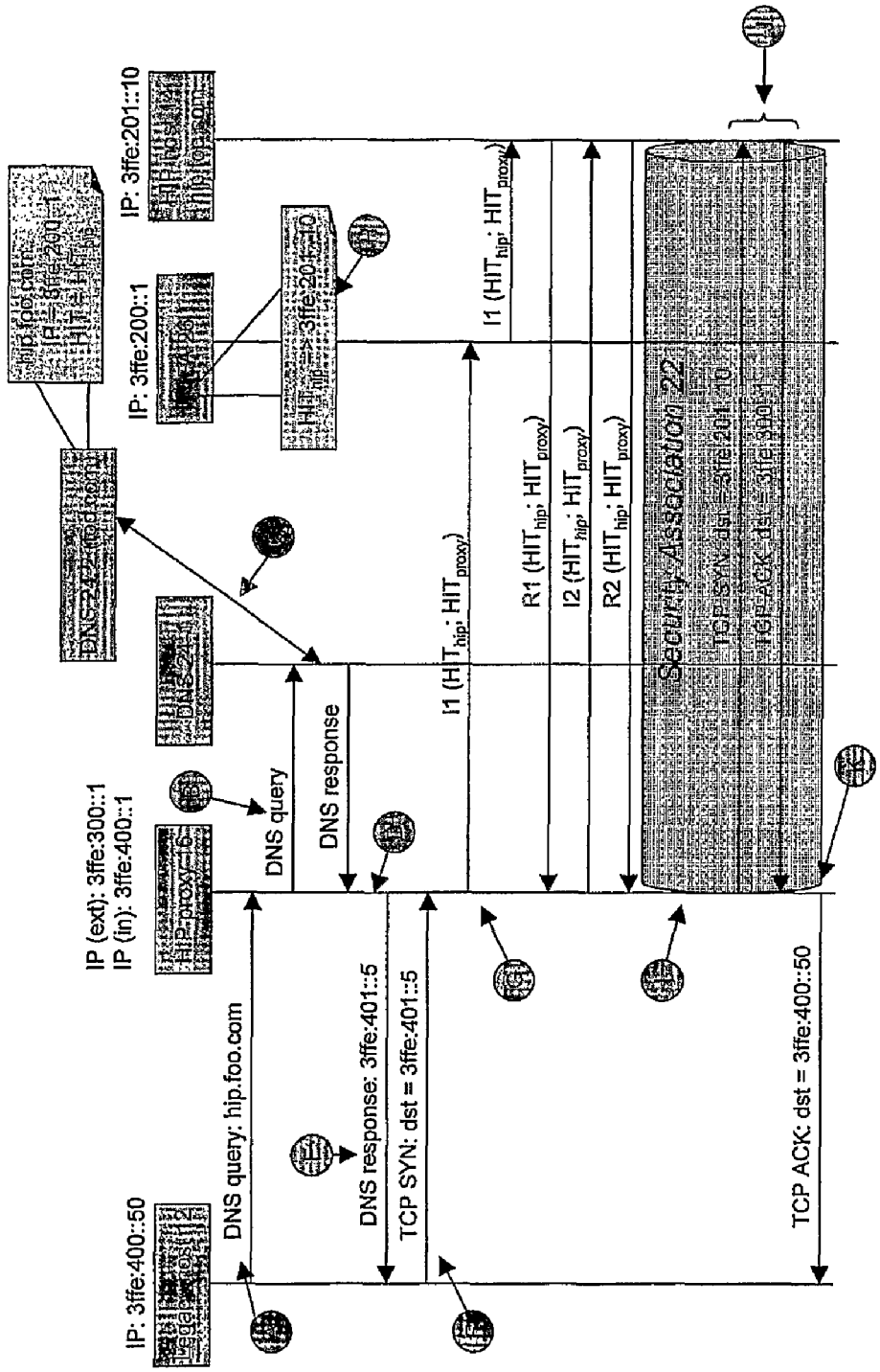
FIG. 6 is a message exchange diagram illustrating schematically a method of at least partially securing communications between a legacy host and a HIP host according to an embodiment of the present invention.
Figure 8:
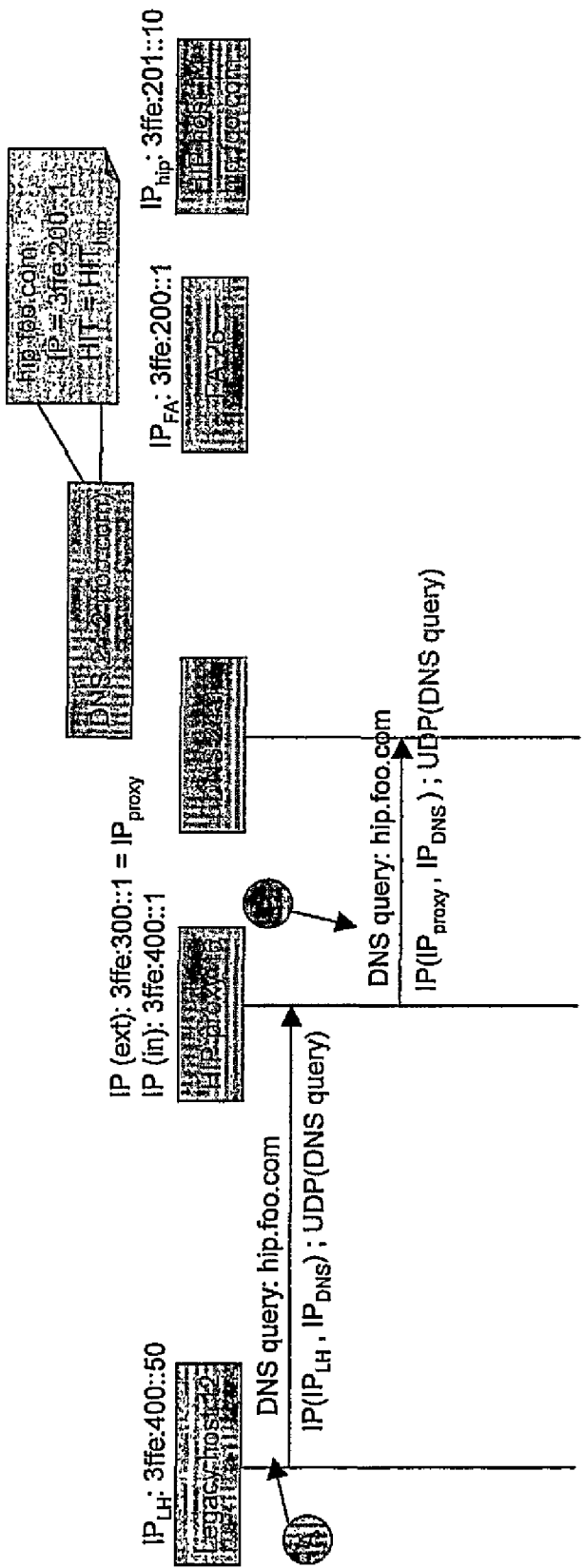
FIGS. 8 to 12 are message exchange diagrams showing the method steps of FIG. 6 in more detail.
Figure 9:
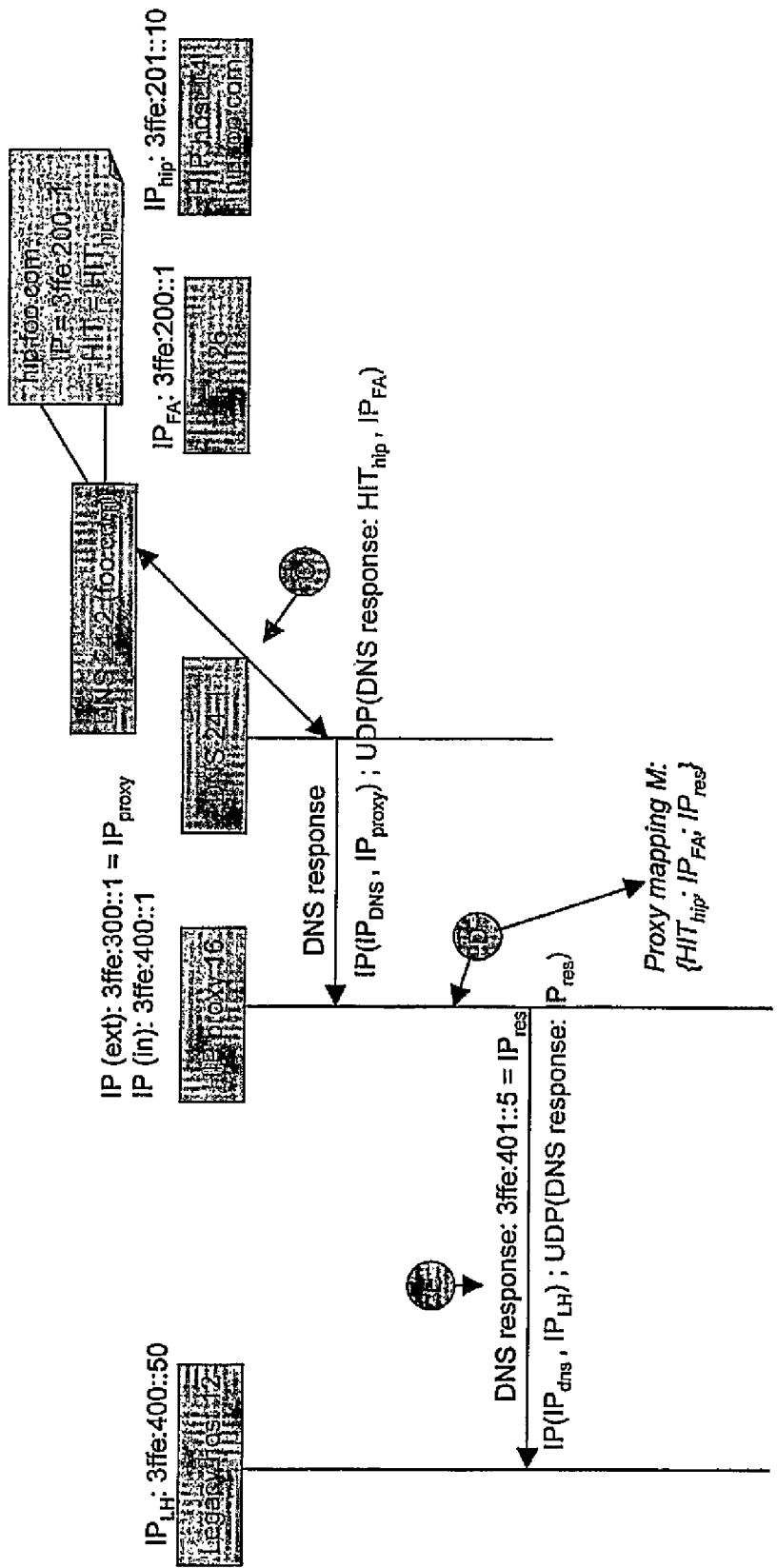

In response to this DNS query, the DNS server 24-1 communicates with the "foo.com" DNS server 24-2 to retrieve an IP address and HIT associated with the HIP host 14 (marked as "C" in FIGS. 6 and 9). Since, in this example, the HP host 14 is using the Forwarding Agent (FA) 26 as a "home address" as described above, the IP address and HIT retrieved by the DNS query is the IP address 3ffe:200::1 ($IP_{fa}$) of the Forwarding Agent 26 and the HIT of the HIP host 14, referred to here as $HIT_{hip}$. Note that it is not always the case that several DNS servers would be required to resolve an IP address; if the information is found from the first server then there would be no need to use additional DNS servers.

Since the HIP proxy 16 knows that the initiating host that sent the DNS query is not HIP-enabled, the HP proxy 16 does not return the DNS information {$HIT_{hip}$; $IP_{fa}$}. Instead, the HP proxy 16 generates a substitute IP address $IP_{res}$, which in this example is 3ffe:401::5. The HP proxy 16 maintains a mapping {$HIT_{hip}$; $IP_{fa}$; $IP_{res}$} between the HIT retrieved from the DNS server 24, the IP address retrieved from the DNS server 24 and the substitute IP address generated by the HP proxy 16. This mapping is required to handle routing of subsequent communications, as will be described below. The generation of the substitute IP address $IP_{res}$ and the maintenance of the mapping is marked as "D" in FIGS. 6 and 9.

In the meantime, the HIP proxy 16 sends a DNS response back to the legacy host 12 with the substitute IP address $IP_{res}$, and this is marked as "E" in FIGS. 6 and 9. The substitute IP address $IP_{res}$ will be used by the legacy host 12 as the destination address for all subsequent communications it sends out to the HIP host 14.

Figure 10:
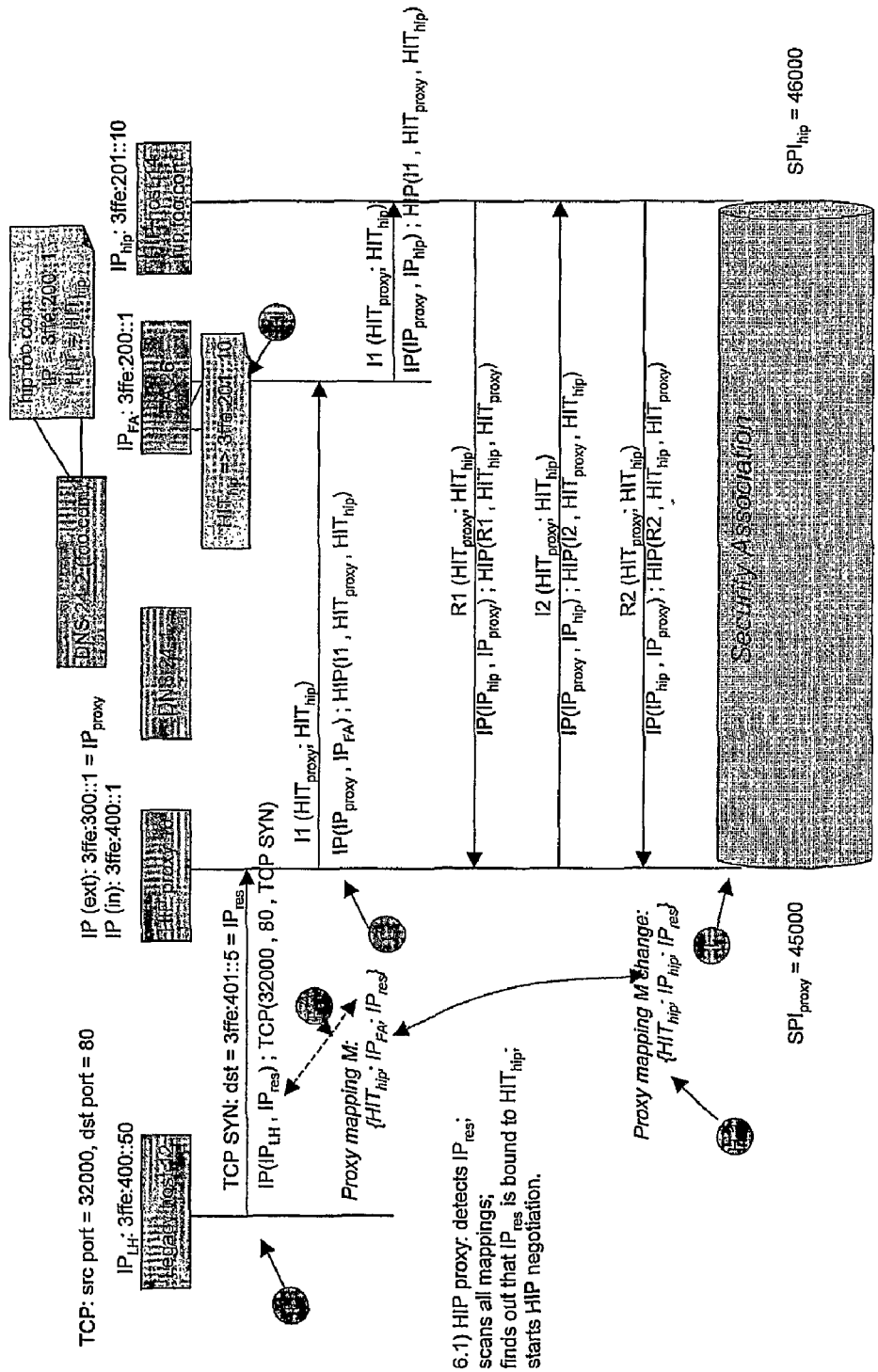
Figure 11:
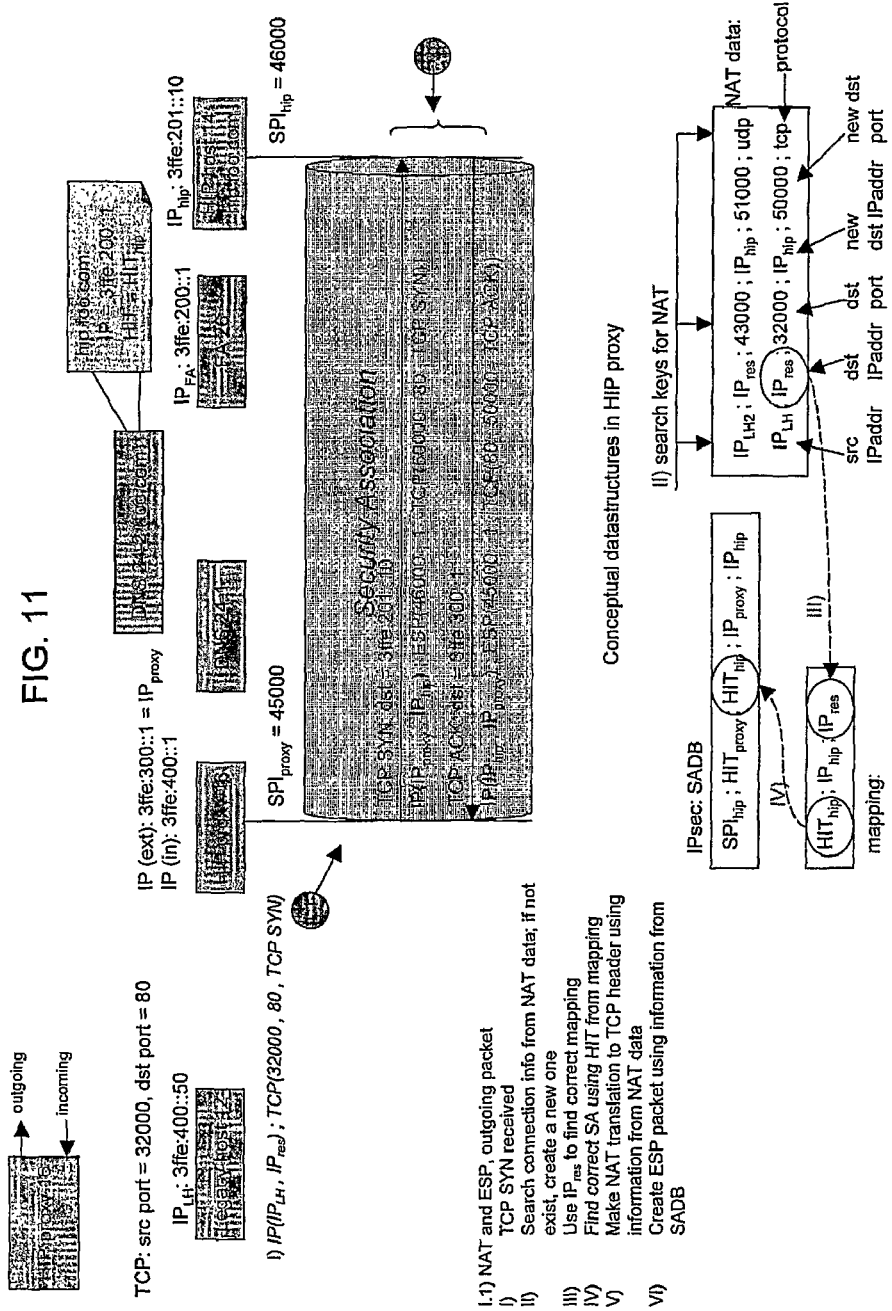

When the legacy host 12 is ready to initiate a connection to the HIP host 14, it sends a session initiation message TCP SYN having as its destination address the substitute IP address $IP_{res}$; this is marked as "F" in FIGS. 6 and 10. Since the substitute IP address $IP_{res}$ was generated by the HIP proxy 16 and maintained in the mapping M, the HP proxy 16 recognises the destination address of the initiation message from the legacy host 12 (marked as "F.1" in FIG. 10), and assumes subsequent responsibility for setting up and handling the communications between the legacy host 12 and the HIP host 14.

The HIP proxy 16 then uses the mapping M to negotiate a secure HIP connection (Security Association) between the HP proxy 16 and the HIP host 14. The negotiation performed between the HIP proxy 16 and the HIP host 14 is very similar to the four-way handshake described above with reference to FIG. 2, with the Initiator in this example being the HIP proxy 16 and the Responder being the HIP host 14. The start of the HIP negotiation is marked as "G" in FIGS. 6 and 10. It should be noted that, where the term "Security Association" is used herein, it should be taken to include the case where a pair of Security Associations is created between the two hosts, one Security Association handling traffic in one direction and the other handling traffic in the other direction; logically there would be one SA pipe between the two hosts but physically there would be two SAs.

Using the mapping M, the HP proxy 16 determines that the I1 packet should be sent to IP address $IP_{fa}$, which is the IP address of the Forwarding Agent 26 used by the HIP host 14. The I1 packet contains the HITs of the nodes participating in the negotiation, i.e. $HIT_{hip}$ and $HIT_{proxy}$. This mapping is marked as "H" in FIGS. 6 and 10. When the I1 packet is received by the Forwarding Agent 26, it performs a mapping from $HIT_{hip}$ to the actual IP address $IP_{hip}$ and performs its usual function of forwarding the received I1 packet to the HP host 14 located by $IP_{hip}$.

Following receipt of the I1 packet at the HIP host 14, the rest of the four-way handshake negotiation is formed as described above with reference to FIG. 2 by the sending of R1, I2 and R2 packets. After this negotiation has been completed, the Security Association 22 between the HP proxy 16 and the HIP host 14 has been established, and this is marked by "I" in FIGS. 6 and 10.

Now that the Security Association 22 has been set up, the HIP proxy 16 continues by sending the TCP SYN initiation message to the HP host 14. The mapping and Network Address Translation (NAT) function performed is shown in more detail in the bottom portion of FIG. 11 and marked as "I.1" in that figure. The HP host 14 responds with a TCP ACK message directed at the IP address of the HIP proxy 16, which in this example is 3ffe:300::1; these two steps are marked as "J" in FIGS. 6 and 11. Finally, the HIP proxy 16 returns a TCP ACK message to the legacy host 12 at its IP address 3ffe:400::50 to complete the TCP initiation procedure; this is marked as "K" in FIGS. 6 and 12. It will be noted that the TCP ACK message marked as "J" in FIGS. 6 and 11 from the HIP host 14 to the HP proxy 16 contained as its destination IP address the IP address of the HIP proxy 16 and not the IP address of the legacy host 12. The method by which the HIP proxy 16 subsequently knows how to send the TCP ACK message to the correct legacy host 12 will now be described.

Only one Security Association 22 is set up between the HIP proxy 16 and the HIP node 14, and this Security Association 22 is used by multiple legacy hosts communicating with the same HIP host 14. The above-described mapping M is associated with a Security Association and not with a particular legacy host such as the legacy host 12. Since the Security Association 22, and its associated mapping M, must be used by a plurality of legacy hosts, the mapping M cannot include information relating to a particular legacy host, such as for example the IP address of the legacy host that was initially responsible for setting up the Security Association 22. Instead, the Network Address Translation (NAT) function in the HIP proxy node handles the mapping of packets to the correct legacy host IP address.

For this purpose, the upper-layer port numbers are used, as for the usual NAT function. For traffic between the HIP host 14 and the legacy host 12 via the HIP proxy 16, the source address when the IP packet arrives at the HIP proxy 16 from the HIP host 14 is originally the IP address of the HIP host 14. The substitute IP address $IP_{hip}$ is retrieved from the mapping M associated with the Security Association 22 and replaced as the source address of the IP packet. The IP packet is then handed over to the NAT function of the HIP proxy 16 and, using the source IP address information and port numbers, the NAT function knows the actual legacy host 12 where the IP packet is to be sent. The NAT function uses both the IP address and the port number for address mapping purposes. The port number alone cannot be used, since two legacy hosts could be using the same source port number. The standardised NAT function also performs port mapping, since otherwise the address translation will not work if two hosts use the same source port number for communication towards the same external node. When performing a NAT mapping, the protocol is also looked up, since UDP and TCP can use the same port numbers.

For example, for two legacy hosts LH1 and LH2 communicating with the external HIP host 14 listening on port 10000:

LH1: source port 5000, dst port 10000, srcIP $IP_{lh1}$, dstIP $IP_{res}$

LH2: source port 5000, dst port 10000, srcIP $IP_{lh2}$, dstIP $IP_{res}$

The HIP proxy 16 makes the mapping for the outgoing (HIP-host-bound) connection as follows:

LH1: new source 5001, dst port 10000, srcIP $IP_{proxy}$, dstIP $IP_{hip}$

LH2: new source 5002, dst port 10000, srcIP $IP_{proxy}$, dstIP $IP_{hip}$

The above is therefore just the standard NAT function, except that the destination address is also changed by the HIP proxy 16 from $IP_{res}$ to $IP_{hip}$.

The HIP host 14 sees two separate connections from the HIP proxy 16 with the same IP address. For the incoming (LH-bound) traffic from the HIP host 14 the HIP proxy 16 can now make the mapping:

dst $IP_{proxy}$, src $IP_{hip}$, dst port 5001, src port 10000=>dst $IP_{lh1}$; src $IP_{res}$; dst port 5000; src port 10000 dst $IP_{proxy}$, src $IP_{hip}$, dst port 5002, src port 10000=>dst $IP_{lh2}$; src $IP_{res}$; dst port 5000; src port 10000

Figure 12:
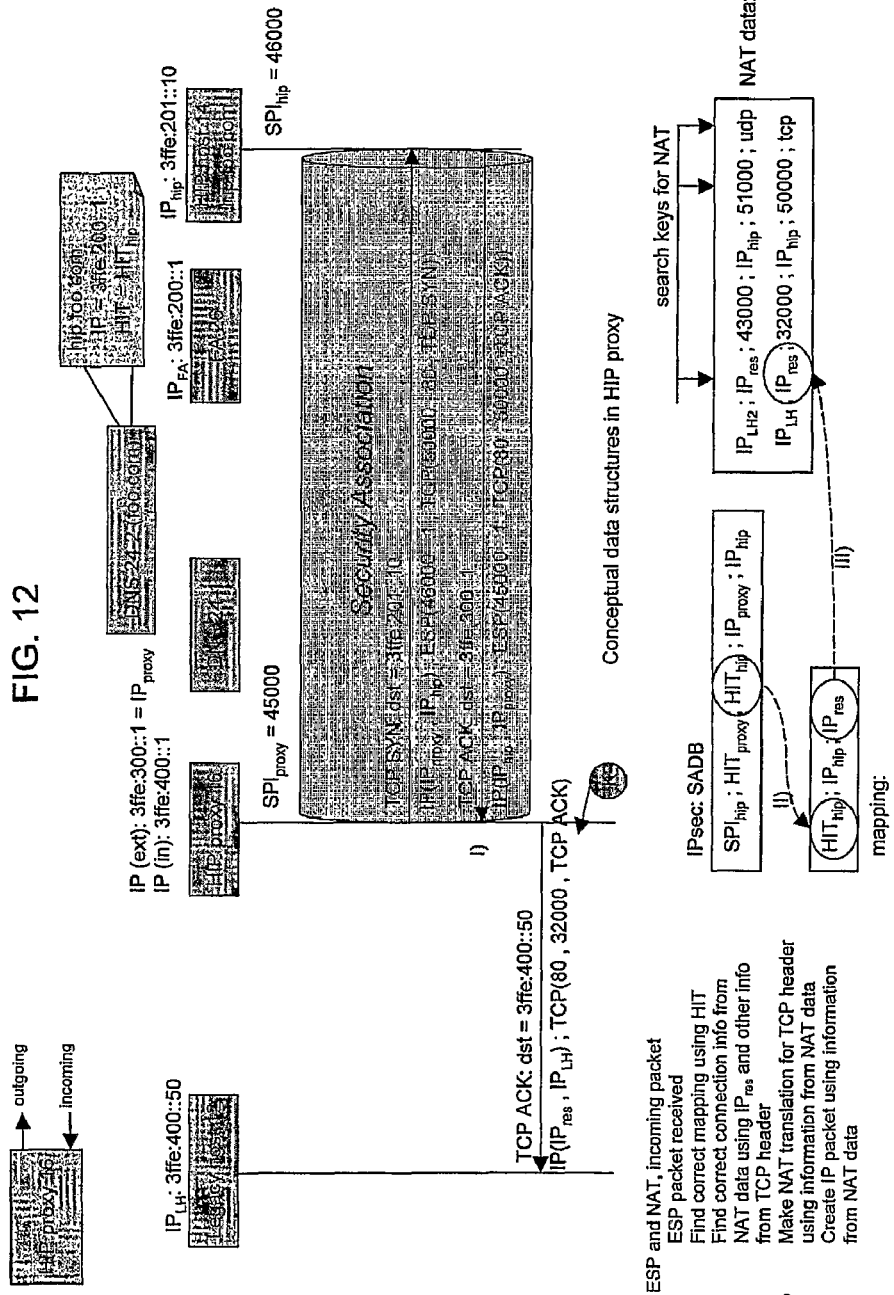

The NAT function for incoming packets is also illustrated in more detail in the bottom portion of FIG. 12 and is marked as "K".

Once the HIP Security Association 22 is set up between the HIP proxy 16 and the HIP host 14, subsequent communications between the legacy host 12 and the HIP host 14 do not pass through the Forwarding Agent 26, which is used only to forward the initial I1 packet as described above. Therefore, for an established Security Association 22, the IP address of the Forwarding Agent ($IP_{fa}$) is no longer needed in the mapping M associated with the Security Association 22. Instead, the current location information (IP address $IP_{hip}$) of the HIP host 14 is required.

Therefore, the IP address of the Forwarding Agent 26 ($IP_{fa}$) can be replaced in the mapping M with the IP address of the HIP host 14 ($IP_{hip}$). In other words, the mapping M is changed from {$HIT_{hip}$; $IP_{fa}$; $IP_{res}$} to {$HIT_{hip}$; $IP_{hip}$; $IP_{res}$}. This is illustrated in FIG. 10 by "H.1". In this way, any subsequent packets sent from the legacy host 12 having as their destination address the substitute IP address $IP_{res}$ can be mapped by the HIP proxy 16 onto the Security Association 22 using the modified mapping M and forwarded directly to the HIP host 14 at location $IP_{hip}$. The source and destination IP addresses are mapped at the HIP proxy 16 from {dst=$IP_{res}$; src=$IP_{lh}$} to {dst=$IP_{hip}$; src=$IP_{proxy}$}, with the mapping being taken from the modified mapping M. The HIP proxy 16 receives the actual IP address $IP_{hip}$ of the HIP host 14 from the R1 packet during HIP negotiation.

Although an embodiment of the present invention has been described above in which the HIP host 14 is located behind a Forwarding Agent 26, the present invention will also apply when no Forwarding Agent is used by the HIP host 14. For example, if the HIP host 14 (with domain name "hip.foo.com") has a fixed IP address $IP_{fixed}$, with no Forwarding Agent, a DNS query will return the fixed IP address $IP_{fixed}$ and the $HIT_{hip}$ of the HIP host 14. When a legacy host 12 tries to resolve the IP address for "hip.foo.com", the HIP proxy 16 will intercept this DNS query and itself retrieve $IP_{fixed}$ and $HIT_{hip}$ from the DNS. The HIP proxy 16 cannot generally know that the IP address returned from the DNS server 24 is the actual IP address of the HIP host 14 and not the IP address of a Forwarding Agent used by the HIP host 14, and therefore it generates a substitute IP address IP, as described above and returns this substitute IP address to the legacy host 12 as before. The HP proxy 16 maintains the mapping {$HIT_{hip}$; $IP_{fixed}$; $IP_{res}$}, listening out for a TCP SYN packet for $IP_{res}$, upon receipt of which it negotiates with the HIP host 14 based upon {$HIT_{hip}$; $IP_{fixed}$} from the mapping. Once the Security Association is set up, packets destined for $IP_{res}$ are picked up by the HIP proxy 16 and forwarded to {$HIT_{hip}$; $IP_{fixed}$} using the mapping. This is much the same procedure as described above, except that $IP_{fa}$ is never stored in the mapping and therefore never replaced. Instead, the mapping comprises the IP address of the HIP host 14 from the start.

If it were possible for the HIP proxy 16 to determine that the IP address retrieved from the DNS server 24 was the actual IP address of the HIP host 14, then an alternative to generating a substitute IP address would be simply to return the actual IP address of the HIP host 14 to the legacy host 12. This would open up the possibility that communications between the legacy host 12 and the HIP host 14 could bypass the HIP proxy 16 altogether since the legacy host 12 has the actual IP address of the HIP host 14. If this were the case, then the communications would not be secured by way of the HIP protocol, but communications would nevertheless be possible based upon standard TCP/IP. However, in small networks, with one outgoing route from the legacy host 12 to the HIP proxy 16, it would still be possible for the HIP proxy 16 to act as a secure gateway between the legacy host 12 and the HIP host 14 with a Security Association established much as before but with no mapping being required between a substitute IP address and the actual IP address of the HIP host 14. Therefore, in the latter case, the mapping M would comprise only the IP address $IP_{hip}$ of the HIP host 14 and the HIT of the HIP host 14, $HIT_{hip}$.

Although it has been described above that the HIP proxy 16 sends a DNS query to an external DNS server 24, it is possible that the HIP proxy 16 could itself also serve the function of a DNS server, with no external DNS query being necessary.

It will be appreciated that operation of one or more of the legacy host 12, HIP proxy 16 and HIP host 14 can be controlled by a program operating on the device. Such an operating program can be stored on a computer-readable medium, or could, for example, be embodied in a signal such as a downloadable data signal provided from an Internet website. The appended claims are to be interpreted as covering an operating program by itself, or as a record on a carrier, or as a signal, or in any other form.

A person skilled in the art will appreciate that embodiments of the present invention are not necessarily limited to any particular protocol for each of the layers, for example in the transport or network layers, and will function within the HIP framework whatever addressing or transport protocol is used around that framework.

What is claimed is:

1. A method for use by a Host Identity Protocol, HIP, proxy node of at least partially securing communications, via the HIP proxy node, between a first host which is not HIP enabled and a second host which is HIP enabled, the method comprising:
   the HIP proxy node receiving a query from the first host to resolve an Internet Protocol, IP, address of the second host;
   in response to said query, the HIP proxy node retrieving an IP address and Host Identity Tag, HIT, associated with the second host;
   in response to said retrieval, the HIP proxy node returning a substitute IP address associated with the second host, and maintaining a mapping between the substitute IP address, the retrieved IP address and the retrieved HIT; and
   upon receipt of a session initiation message from the first host including as its destination address the substitute IP address, the HIP proxy node using the mapping to negotiate a HIP connection between the HIP proxy node and the second host.

2. A non-transitory computer-readable medium having stored therein a computer program which, when loaded on a HIP proxy node, causes the HIP proxy node to carry out the method as claimed in claim 1.

3. The method as claimed in claim 1, wherein the step of using the mapping to negotiate the HIP connection between the HIP proxy node and the second host comprises:
   the HIP proxy node looking up the retrieved IP address and the retrieved HIT from the mapping based on the substitute IP address in the session initiation message; and
   the HIP proxy node performing the HIP negotiation using the retrieved IP address and the retrieved HIT to locate and identify a Responder in the HIP negotiation together with an IP address and HIT of the HIP proxy node to locate and identify an Initiator in the HIP negotiation.

4. The method as claimed in claim 1, wherein the retrieved IP address is an IP address of a Forwarding Agent used by the second host, the method further comprising initiating the HIP negotiation between the HIP proxy node and the second host by the HIP proxy node sending an initial HIP negotiation packet to the Forwarding Agent.

5. The method as claimed in claim 4, further comprising, following receipt of an actual IP address of the second host at the HIP proxy node during the HIP negotiation, the HIP proxy node including the actual IP address in the mapping maintained at the HIP proxy node.

6. The method as claimed in claim 5, further comprising the HIP proxy node replacing the retrieved IP address in the mapping by the actual IP address following its receipt at the HIP proxy node.

7. The method as claimed in claim 1, wherein the retrieved IP address is an actual IP address of the second host.

8. The method as claimed in claim 1, further comprising generating the substitute IP address at the HIP proxy node.

9. The method as claimed in claim 1, further comprising, for an outgoing message received at the HIP proxy node after the HIP connection has been established including as its destination address the substitute IP address, the HIP proxy node using the mapping to route the outgoing message over the HIP connection to the second host.

10. The method as claimed in claim 9, wherein the retrieved IP address is an IP address of a Forwarding Agent used by the second host, the method further comprising:
    the HIP proxy node initiating the HIP negotiation between the HIP proxy node and the second host by sending an HIP negotiation packet to the Forwarding Agent;
    following receipt of an actual IP address of the second host at the HIP proxy node during the HIP negotiation, the HIP proxy node including the actual IP address in the mapping maintained at the HIP proxy node;
    the HIP proxy node looking up the actual IP address and the retrieved HIT from the mapping based on the substitute IP address in the outgoing message;
    the HIP proxy node routing the outgoing message to the second host using the actual IP address and the retrieved HIT to locate and identify a destination of the outgoing message; and
    the HIP proxy node using an IP address and HIT of the HIP proxy node to locate and identify the source of the outgoing message.

11. The method as claimed in claim 1, further comprising:
    the HIT proxy node completing an establishment of communications between the first and second hosts by forwarding the session initiation message from the HIP proxy node to the second host over the HIP connection;
    the HIT proxy node receiving a session acknowledgment message from the second host over the HIP connection; and
    the HIT proxy node routing the session acknowledgment message to the first host.

12. The method as claimed in claim 11, wherein the session acknowledgment message is a TCP ACK message.

13. The method as claimed in claim 1, wherein the session initiation message is a TCP SYN message.

14. The method as claimed in claim 1, further comprising, for an incoming message received at the HIP proxy node from the second host over the established HIP connection, the HIP proxy node using a NAT function to route the incoming message to the appropriate destination host.

15. The method as claimed in claim 1, herein the query is a DNS query.

16. The method as claimed in claim 1, wherein the HIP proxy node retrieves the IP address and HIT associated with the second host from an external DNS server.

17. The method as claimed in claim 1, wherein the HIP proxy node retrieves the IP address and HIT associated with the second host from an internal DNS server.

18. The method as claimed in claim 1, wherein the HIP proxy node intercepts the query from the first host.

19. A Host Identity Protocol, HIP, proxy node for use in at least partially securing communications, via the HIP proxy node, between a first host which is not HIP enabled and a second host which is HIP enabled, comprising:

means for receiving a query from the first host to resolve the Internet Protocol, IP, address of the second host;

means for retrieving, in response to said query, an IP address and Host Identity Tag, HIT, associated with the second host, for returning, in response to said retrieval, a substitute IP address associated with the second host, and maintaining a mapping between the substitute IP address, the retrieved IP address and the retrieved HIT; and means for using the mapping, upon receipt of a session initiation message from the first host including as its destination address the substitute IP address, to negotiate a HIP connection between the HIP proxy node and the second host.

20. A non-transitory computer-readable medium having stored therein a computer program which, when loaded into a proxy node, causes the proxy node to become a HIP proxy node as claimed in claim 19.

\* \* \* \* \*

UNITED STATES PATENT AND TRADEMARK OFFICE
CERTIFICATE OF CORRECTION

PATENT NO. : 7,827,313 B2
APPLICATION NO. : 10/589238
DATED : November 2, 2010
INVENTOR(S) : Salmela et al.

Page 1 of 2

It is certified that error appears in the above-identified patent and that said Letters Patent is hereby corrected as shown below:

On the Face Page, in Field (54), under Title, in Column 1, Line 1,
after "ADDRESSING METHOD AND" delete "METHOD AND".

On Page 2, in Field (56), under "OTHER PUBLICATIONS", in Column 2, Line 2,
delete "[nternet" and insert -- Internet --, therefor.

In Fig. 7, Sheet 6 of 11, under "Examples:", in Line 3, delete "(IPa, IPb)" and insert -- ($IP_a$, $IP_b$) --, therefor.

In Fig. 7, Sheet 6 of 11, under "Examples:", in Line 4, delete "(IPa, IPb)" and insert -- ($IP_a$, $IP_b$) --, therefor.

In Column 1, Line 1, after "ADDRESSING METHOD AND" delete "METHOD AND".

In Column 1, Line 63, delete "changed," and insert -- changed; --, therefor.

In Column 6, Line 5, delete "trust The" and insert -- trust the --, therefor.

In Column 6, Line 19, delete "on The" and insert -- on the --, therefor.

In Column 6, Line 39, delete "HP" and insert -- HIP --, therefor.

In Column 9, Line 32, delete "HP" and insert -- HIP --, therefor.

In Column 9, Line 54, delete "HP" and insert -- HIP --, therefor.

In Column 9, Line 64, delete "HP" and insert -- HIP --, therefor.

In Column 9, Line 66, delete "HP" and insert -- HIP --, therefor.

In Column 9, Line 67, delete "HP" and insert -- HIP --, therefor.

In Column 10, Line 3, delete "HP" and insert -- HIP --, therefor.

In Column 10, Line 19, delete "HP" and insert -- HIP --, therefor.

Signed and Sealed this
Twelfth Day of July, 2011

David J. Kappos
*Director of the United States Patent and Trademark Office*

CERTIFICATE OF CORRECTION (continued)
U.S. Pat. No. 7,827,313 B2

In Column 10, Line 27, delete "HP" and insert -- HIP --, therefor.

In Column 10, Line 40, delete "HP" and insert -- HIP --, therefor.

In Column 10, Line 48, delete "HP" and insert -- HIP --, therefor.

In Column 10, Line 54, delete "HP" and insert -- HIP --, therefor.

In Column 10, Line 59, delete "HP" and insert -- HIP --, therefor.

In Column 10, Line 62, delete "HP" and insert -- HIP --, therefor.

In Column 11, Line 3, delete "HP" and insert -- HIP --, therefor.

In Column 12, Line 43, delete "IP," and insert -- $IP_{res}$ --, therefor.

In Column 12, Line 45, delete "HP" and insert -- HIP --, therefor.

In Column 14, Line 27, in Claim 10, delete "sending an" and insert -- sending the --, therefor.

In Column 14, Line 63, in Claim 15, delete "herein" and insert -- wherein --, therefor.